March 3, 1964     M. C. DARLING     3,123,335
STABILIZED PISTON VALVE
Filed March 13, 1961
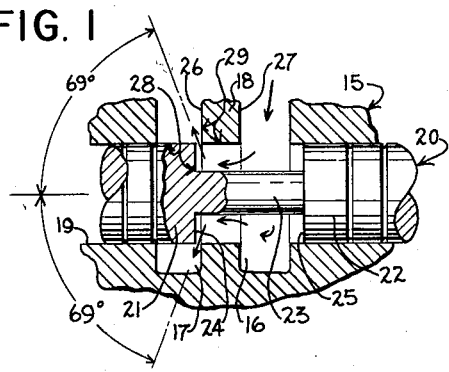
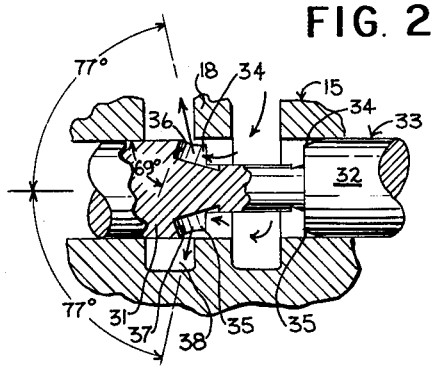
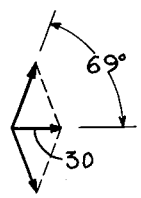
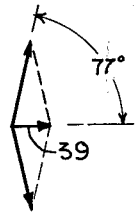
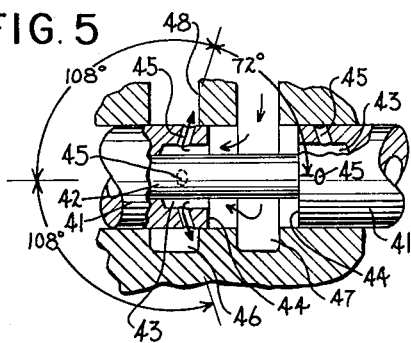
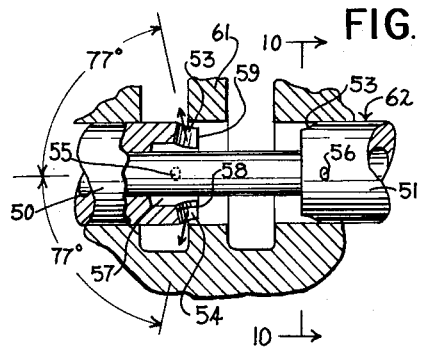
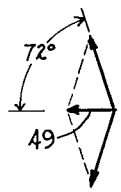
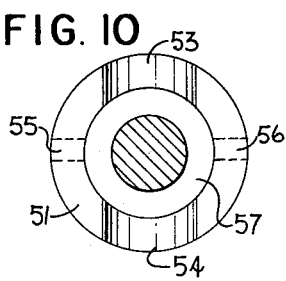
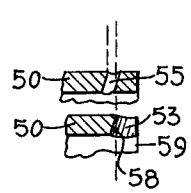
MARVIN C. DARLING
*INVENTOR.*
BY *Hubert Miller*
ATTORNEY United States Patent Office 3,123,335
Patented Mar. 3, 1964

3,123,335
STABILIZED PISTON VALVE
Marvin C. Darling, Burrton, Kans., assignor to The Cessna Aircraft Company, Wichita, Kans., a corporation of Kansas
Filed Mar. 13, 1961, Ser. No. 95,326
5 Claims. (Cl. 251—282)

This invention relates to spool or plunger type fluid flow control valves.

Such valves include a housing having a cylindrical bore which is intersected by two or more axially spaced fluid flow chambers. Each pair of adjacent chambers is separated by a fixed land encircling the bore and integral with the housing. The spool or plunger has adjacent axially spaced lands separated by a groove. Each spool land has a control face which coacts with the control face of the fixed land to provide a spool restricted variable area flow passage between the mentioned fluid flow chambers. The control faces of the spool land and of the fixed land are parallel to each other and perpendicular to the longitudinal axes of the spool and its bore.

It is a generally known inherent characteristic of such valves that fluid flowing under pressure from one valve chamber to an adjacent chamber reacts dynamically to create a Bernoulli force, the resultant of which is transmitted axially to the spool. This force is greatest as a spool land closely approaches a fixed land and begins to meter the fluid through the small opening between the adjacent edges of the lands at maximum system pressure. The resultant axial Bernoulli force created exerts a force on the spool to move it rapidly toward a position to completely block fluid flow between chambers. The same force resists movement of the spool away from a flow blocking position.

This unbalanced axially applied Bernoulli force is so large as to defy efforts of the valve operator to maintain the necessary precise control of spool movement. Loss of precise control of the spool causes "hammer" in the hydraulic system, possible damage to fluid actuated equipment, and most certainly erratic control over such equipment as is controlled by the valve.

It is a primary object of this invention to provide a method and a spool type valve construction which utilize fluid under pressure flowing from one valve chamber through a spool restricted passage into a receiving valve chamber to create and transmit to the spool substantially equal and opposite resultant Bernoulli forces, thus eliminating the inherent characteristic of the spool to move rapidly into or to resist movement away from a flow blocking position, despite efforts of an operator to maintain the spool under his precise control.

It is a further object to provide a spool construction which divides the fluid flowing from one chamber in the valve into another chamber, as a spool land begins to meter the fluid flowing through the spool restricted passage between chambers, and which delivers the divided flow of fluid into the receiving chamber in opposing directions, thereby creating and transmitting to the spool substantially equal and opposite resultant axial Bernoulli forces.

The invention, together with other objects, will be more clearly understood when the following description is read in connection with the accompanying drawings, in which:

FIG. 1 is a fragmentary central longitudinal view of a conventional spool type valve, the lands of the housing and of the spool having control faces which are parallel to each other and perpendicular to the spool axis;

FIG. 2 is a similar view of the FIG. 1 valve, but illustrates the spool lands as being modified by undercut notches offset axially away fom the land control faces;

FIGS. 3 and 4 are force diagrams respectively illustrating the resultant axial Bernoulli forces created by fluid flowing under high pressure through the spool restricted passages in the valves of FIGS. 1 and 2;

FIG. 5 is a view similar to FIGS. 1 and 2, and illustrates my invention embodied in a conventional valve of the general type shown in FIG. 1;

FIG. 6 is a similar view showing my invention embodied in a valve of the general type illustrated in FIG. 2;

FIG. 7 is a force diagram, and when considered with FIG. 3, the two diagrams illustrate the substantially equal and opposite resultant Bernoulli forces acting axially on the spool of the FIG. 5 embodiment of my invention;

FIGS. 8 and 9 are force diagrams showing the substantially equal and opposite resultant Bernoulli forces acting on the valve spool of the FIG. 6 embodiment of my invention;

FIG. 10 is an enlarged transverse sectional view of the valve spool only of the FIG. 6 valve, and is taken along the plane 10—10 of FIG. 6; and FIG. 11 is a composite fragmentary radial sectional view of a land of the FIG. 6 valve spool.

Referring to FIG. 1 of the drawings illustrating a control valve of conventional construction, the valve body 15 is provided with a pressure fluid supply chamber 16 and a fluid receiving chamber 17, which are separated by a land 18. The inner surface of land 18 is cylindrical and is a continuation of a bore 19 in the valve body, which bore slidably receives a flow control spool 20. Spool 20 has at least two axially spaced lands 21 and 22, separated by a groove 23. The spool land control faces 24 and 25, and the body land control faces 26 and 27 lie in parallel planes which are perpendicular to the axis of bore 19, as indicated by the 90° angles 28 and 29.

When the spool 20 is positioned to center fixed land 18 with respect to the spool control faces 24 and 25 full volume flow of fluid under normal system pressure may flow from chamber 16 through the passageway defined by groove 23 and land 18 into chamber 17.

When the spool 20 is moved to the right to the position shown in FIG. 1, the flow area of the passageway is materially restricted, and fluid flows through the spool restricted passageway at maximum volume and velocity and at maximum pressure.

Under such a condition tests have established that in this particular type of valve fluid enters chamber 17 at a flow angle of approximately 69°, as indicated in FIG. 1. A Bernoulli force is created by the flow of fluid through the spool restricted passage, and this force is imparted to the spool in a direction opposite to the direction of flow of the fluid. The Bernoulli force will increase with an increase in velocity and volume of flow, assuming no change in the passage flow area.

The direction and relative magnitude of the resultant force tending to move spool 20 to a flow blocking position (to the right) is illustrated by the arrow 30 in FIG. 3.

A modification of the FIG. 1 valve is illustrated in FIG. 2. In this valve each of the lands 31 and 32 of spool 33 is provided with two or more notches 34 and 35 which are offset axially away from the control faces of the respective lands, and are under cut at an angle of from 60° to 70°. These notches are equally spaced circumferentially around the lands. The undercut surfaces 36 and 37 of these notches are effective to increase the flow angle of fluid entering the receiving chamber 38. The notches afford continued flow of fluid after the control face of land 31 has met and passed the control face of the fixed body land 18. The increase in the flow angle with respect to the spool axis, in this case to 77°, results in a considerable reduction in the resultant Bernoulli force tending to move the spool toward a flow blocking position just prior to the moving of the spool into such a position.

The reduced resultant force is indicated by the reduced length of arrow 39 in FIG. 4 as compared to the length of the force arrow 3 in FIG. 3. The above briefly described modified spool valve construction is the subject matter of pending United States patent application Serial No. 842,439 filed September 25, 1959, now Patent No. 3,009,480, by Wendell E. Miller.

*Fig. 5 Embodiment*

Referring now to that embodiment of my invention illustrated in FIG. 5, the adjacent control face ends of the spool lands 40 and 41 are each provided with a blind bore which together with the adjacent portion of spool shank 42 define fluid by-passes 43 surrounding the shank, and offset axially away from the right angle control faces 44 of the lands.

A plurality of small holes 45 are drilled at an obtuse angle through the skirt of each land affording flow of fluid into or out of the by-passes 43, depending on which land is approaching a flow blocking position, and which direction the fluid is flowing between chambers 46 and 47. In the valve illustrated four such holes have been drilled into each land adjacent the land control faces 44, and at angles of 108° with respect to the spool axis, as indicated. A greater or smaller number of such holes may be provided so long as they are equally spaced circumferentially. The angle of 108° is not critical, but may be greater or smaller, depending on the magnitude of the inherently present spool moving Bernoulli force characteristics of the particular valve and hydraulic system. The diameter of the holes 45 may also be varied to suit the particular application.

In the described FIG. 5 valve, as the spool is moved toward a flow blocking position, the fluid flowing between the adjacent edges of control faces 44 and 48 creates a resultant Bernoulli force, as described in connection with the FIG. 1 valve and as indicated by the arrow 30 in FIG. 3, which acts to move the spool to the right in FIG. 5. At the same time, the fluid flowing through holes 45 is entering chamber 46 in an opposing direction parallel to the long axes of the holes 45. The flow through these holes creates a counter-balancing resultant Bernoulli force which acts axially on the spool in the opposite direction, as indicated by the force arrow 49 in FIG. 7. Since the two resultant forces counter-balance each other, the valve operator is able to maintain a precise control over movement of the spool into and away from either of its flow blocking positions.

So far as is known at the present writing, only experimentation will provide the proper combination of the diameter of holes 45, their longitudinal location with respect to the land control faces 44, and their angle with respect to the long axis of the spool, in order to produce a Bernoulli force of the proper magnitude to counterbalance the inherent Bernoulli force in any particular application.

At any rate, these holes 45 plus the bore 43 in each land constitute a physical means for and provide a method of physically dividing the fluid flowing from either of the valve body chambers 46 or 47 through the spool restricted passage into the other chamber, and for delivering the divided flow into the receiving chamber at opposed angles to create and transmit to the spool, as the control face of either land aproaches a flow blocking position, substantially equal and opposite resultant Bernoulli forces, to thus relieve the valve operator of having to "fight" an unbalanced force being transmitted to the spool.

*Fig. 6 Embodiment*

FIG. 6 illustrates a valve which combines the spool constructions illustrated in the FIG. 2 and FIG. 5 valves.

Each spool land 50 and 51 is provided with a pair of diametrically opposite undercut notches 53 and 54, and a pair of diametrically opposed holes 55 and 56 (FIG. 10), respectively spaced an angular distance of 90° from the notches 53 and 54. Each land is provided with a blind bore 57, as in the FIG. 5 valve, and the holes 55 and 56 are drilled at an obtuse angle with respect to the spool axis, in this case at approximately 108°, as in the FIG. 5 valve, to connect with bore 57. The preferred relative longitudinal location of the holes 55 and 56 with respect to the sloping undercut surfaces 58 of the notches is clearly shown in FIG. 11.

In this FIG. 6 embodiment of my invention the undercut notches 53 and 54 serve to reduce the resultant Bernoulli force acting to move the spool toward a flow blocking position, and also provide a less abrupt cut off of fluid flow. After control face 59 has met and passed control face 60 of fixed land 61, fluid can flow only through the notches 53 and 54 and holes 55 and 56.

The Bernoulli force transmitted to the spool in a flow blocking direction by fluid flow through the notches 53 and 54 will be counter balanced by the Bernoulli force created by fluid flow through the holes 55 and 56.

As the spool is moved progressively toward a flow blocking position, the force 39 (FIG. 8) will be reduced as a result of reduced volume flow through the notches. The angle of fluid flow (77°—FIG. 6) will also tend to decrease as volume flow through the notches is reduced. This decrease in flow angle will decrease the rate at which force 39 is being reduced.

As flow through the notches is blocked, flow through holes 55—56 is also being reduced, as will be clear from FIG. 11. The flow through a partially covered hole 55 begins to act as flow through a notch, and reduction in volume flow through holes 55 and 56 will reduce the counterbalancing force 62, FIG. 9. The flow angle 180° (FIG. 5) will simultaneously start reducing, which in turn will further reduce the force 62 (FIG. 9). Force 62 will thus reduce at a higher rate than force 39.

The relative location of the holes and notches shown in FIG. 11 equalizes the difference in the rate of reduction of the forces 39 and 62. The result is that the operator has complete and precise control of the valve throughout its movement toward and away from a flow blocking position. There is no "hammer" created in the hydraulic system by the cut off of fluid flow, and the motor or other fluid actuated device being controlled by the valve remains under complete and precise control of the operator throughout spool movement. Tests have proven that such results can be obtained by my invention in a flow range of 0 to 25 gallons per minute, and in a pressure range of 0 to 3000 pounds per square inch. There is no reason to believe that it will not produce the same results in wider ranges of flow and pressure.

Having described the method and two physical embodiments of the invention with sufficient clarity to enable those familiar with this art to make and use it, I claim:

1. In a spool type control valve, a flow control spool having two axially spaced generally cylindrical lands connected by an integral concentric shank and separated by an annular groove the bottom of which is defined by the shank, the adjacent ends of the respective lands constituting flow control faces which lie in planes parallel to each other and perpendicular to the longitudinal axis of the spool; at least two internal flow passages defined within at least one of said lands, each said flow passage comprising a first portion communicating with said groove and extending away from the land control face alongside and parallel to the spool axis, and a second communicating linear portion extending from the cylindrical surface of the land inward toward the spool axis and away from the land control face at an acute included angle with respect thereto.

2. The valve spool described in claim 1 in which the second portions of the respective internal flow passages are in bilaterally symmetrical locations around the cylindrical outer surface of the land.

3. The valve spool described in claim 1 in which at least one land is provided with a plurality of the described internal flow passages, and in which the said second portions of the respective flow passages are in equally spaced locations around the cylindrical outer surface of the land.

4. In a valve, a flow control spool having two axially spaced apart generally cylindrical lands connected by an integral concentric shank and separated by an annular groove the bottom of which is defined by the shank, there being notch means formed in the adjacent ends of at least one of the respective lands, the major portions of which land ends constituting flow control faces which lie in planes perpendicular to the axis of the spool; at least two internal flow passages disposed within said one land, each of said flow passages comprising a first portion communicating with said groove and extending away from the land control face parallel to the spool axis, and a second portion communicating therewith and angularly disposed with respect thereto, said second portion extending from the cylindrical surface of the land inward toward the spool axis and away from the land control face at an acute angle with respect thereto, said second portions of each of the internal flow passages being transversely aligned with one another and lying in a common conical reference surface generated about the axis of said spool.

5. In a valve, the flow control spool of claim 4, wherein plural notch means are formed in the end of said one land thereby providing at least two relieved areas, said relieved areas disposed in diametrically opposed relation to one another and being of an undercut formation and defining an acute angle with respect to the spool axis.

References Cited in the file of this patent

UNITED STATES PATENTS

| | | |
|---|---|---|
| 2,747,612 | Lee | May 29, 1956 |
| 2,755,815 | Erle | July 24, 1956 |
| 2,812,775 | Hodgson | Nov. 12, 1957 |
| 2,971,536 | Junck | Feb. 14, 1961 |